C. I. E. MASTIN.
PACKING FOR PISTON RODS, &c.
APPLICATION FILED JUNE 24, 1911.

Patented Feb. 20, 1912.

UNITED STATES PATENT OFFICE.

CHARLES I. E. MASTIN, OF MIDLAND PARK, NEW JERSEY.

PACKING FOR PISTON-RODS, &c.

1,018,202.  Specification of Letters Patent.  Patented Feb. 20, 1912.

Application filed June 24, 1911. Serial No. 635,231.

*To all whom it may concern:*

Be it known that I, CHARLES I. E. MASTIN, a citizen of the United States, residing at Midland Park, in the county of Bergen and State of New Jersey, have invented certain new and useful Improvements in Packing for Piston-Rods, &c., and do hereby declare that the following is a full, clear, and exact description of the same, reference being had to the annexed drawings, making a part of this specification, and to the letters and figures of reference marked thereon.

The object of my invention is to provide a packing for piston rods and other moving or other parts of engines and machinery where a tight joint against the passage of steam, air, gas, oil, water, etc., is required, which packing will have the qualities of pliability and elasticity, so that while capable of easy application to the stuffing box it will, nevertheless, quickly respond to conditions calling for compression or expansion to make the tight joint, and adapt itself to non-alinement of the parts, and which will be durable so that it will possess these qualities for a long time, and to this end my invention consists in the packing having the characteristics of construction as hereinafter specified and claimed.

Figure 1:
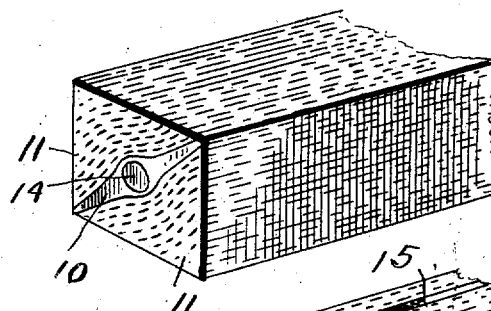
Figure 2:
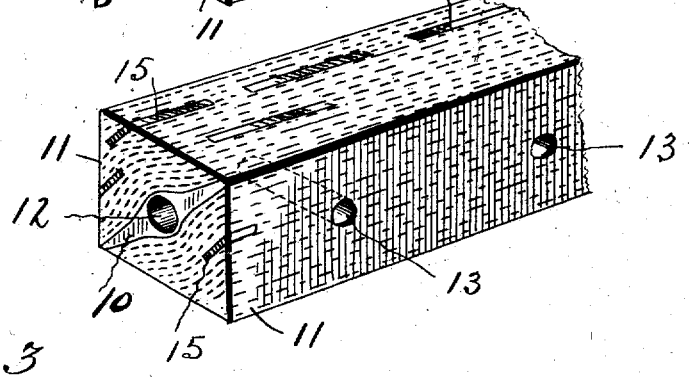
Figure 3:
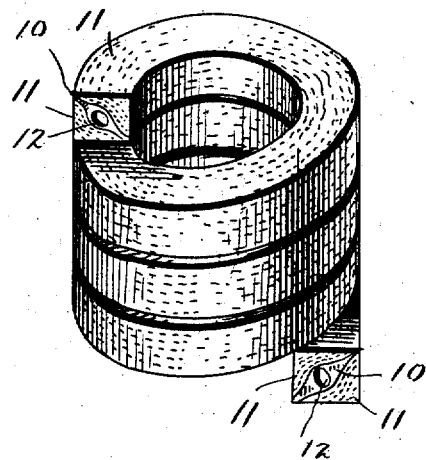

Referring to the accompanying drawings—Figure 1 is a perspective view of a section of packing embodying my invention; Fig. 2 is a similar view of a different embodiment of my invention in which the core is porous; Fig. 3 is a perspective view illustrating a spiral form of packing; and Fig. 4 a like view showing a ring form thereof.

Briefly described, my packing comprises a yieldable or elastic core and a covering or envelop of textile or fibrous material, or a combination of fibrous and metallic strands interwoven or interspersed with friction reducing and wear resisting metal, and its form in cross section may be any shape desired, whether square or oblong or octagonal or triangular or round. It will, therefore, be understood that I do not limit myself to any particular form in cross section. As illustrated in the drawings, the packing shown is square in cross section, and the yieldable or elastic core 10 made of rubber, or any equivalent material, is in the form of a strip that extends diagonally and is covered, or inclosed, by sections 11 of woven or fibrous material. The core has an opening 12 extending longitudinally through it constituting an oil proof air chamber, or oil duct, although in some cases it may be desirable to fill said duct with rubber 14 of a different character to form an internal cushion, and at intervals transverse openings 13 may be provided that intersect centrally the longitudinal extending opening 10 to form oil or lubricant distributing ducts. The envelop may contain wear resisting metal pieces to reduce the friction, which pieces may, as shown in Fig. 2, be in the form of thin metal strips or slugs 15, of Babbitt metal.

By reason of the inclined or diagonal disposition of the yieldable or elastic core flanked on opposite sides by a body of material capable of resisting wear, it will be seen that the body of material on one side of said core, when the packing is subjected to pressure, will slide, or tend to slide, laterally against one of the surfaces to be packed, while the body of material on the opposite side will tend to slide laterally against the surface of the opposite part to be packed, and that, as far as this result is concerned, it is immaterial how the packing strip is applied. Indeed the same result is secured as far as the opposite expansion of the wear sustaining portions of the packing are concerned, if the lines of pressure be parallel with the core widthwise considered.

Figure 4:
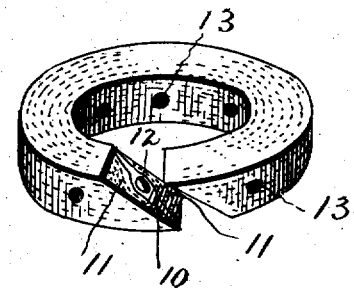

As shown in Figs. 3 and 4 of the drawings, the packing strip may be wound into a spiral form or into a ring form, the packing being cured in a mold of the desired shape according to the requirements of the stuffing boxes. In constructing a ring the ends thereof may be joined by a dowel of elastic or other material inserted in the alining end portions of the opening 12. The rubber or other elastic core is oil proof. Although yielding to pressure so as properly to bear against the surface to be packed, nevertheless, when pressure is lessened, or removed, my packing promptly returns to its original form, and yet, by reason of the character of the envelop it is capable of resisting wear and performing services for a long period. Whatever the nature of the wear resisting body portions they should contain rubber or some other elastic materials to a limited extent.

Having thus described my invention what I claim is—

1. A packing comprising a yieldable core and a wear resisting enveloping body said core being hollow longitudinally at its center and consisting of a strip that extends from the hollow central portion in opposite direction toward the exterior of said body.

2. A packing comprising a yieldable core and a wear resisting enveloping body consisting of a fibrous and elastic compound, the portions of the wear resisting body being capable of substantial bodily movement by reason of said yieldable core said core being a thin body or strip extending through the packing and rendering said portions distinct from each other.

3. A packing comprising a yieldable core and a wear resisting enveloping body, said core being obliquely disposed in said body and separating the same in the form of similar, but oppositely disposed members, the core being a strip lying wholly between them.

4. A packing comprising a yieldable core and a wear resisting enveloping body, said packing having lubricant ducts or openings extending to the exterior of the packing.

5. A packing comprising a yieldable core and a wear resisting enveloping body and separating the same in the form of similar, but oppositely disposed members, the core being a strip lying wholly between them, said body having metallic pieces embedded therein.

6. A packing comprising a yieldable core and a wear resisting enveloping body formed of a fabric having metallic strands said core being in the form of a thin body or strip lying between and inclosed by said enveloping body and dividing the same into similar sections disposed on opposite sides of the core.

In testimony whereof I affix my signature in presence of two witnesses.

CHARLES I. E. MASTIN.

Witnesses:
RAYTON E. HORTON,
EDITH M. STAGG.